(12) United States Patent
Michalsky et al.

(10) Patent No.: US 11,721,125 B2
(45) Date of Patent: Aug. 8, 2023

(54) DEVICE FOR DISPLAYING INFORMATION AND FOR CAPTURING AUTOPODIAL IMPRESSIONS

(71) Applicant: JENETRIC GmbH, Jena (DE)

(72) Inventors: Tom Michalsky, Zwenkau (DE); Undine Richter, Jena (DE); Philipp Riehl, Jena (DE); Daniel Krenzer, Wutha-Farnroda (DE); Jörg Reinhold, Jena (DE)

(73) Assignee: JENETRIC GmbH, Jena (DE)

( * ) Notice: Subject to any disclaimer, the term of this patent is extended or adjusted under 35 U.S.C. 154(b) by 0 days.

(21) Appl. No.: 17/764,919

(22) PCT Filed: Aug. 20, 2020

(86) PCT No.: PCT/EP2020/073384
§ 371 (c)(1),
(2) Date: Mar. 29, 2022

(87) PCT Pub. No.: WO2021/063597
PCT Pub. Date: Apr. 8, 2021

(65) Prior Publication Data
US 2022/0343671 A1 Oct. 27, 2022

(30) Foreign Application Priority Data
Sep. 30, 2019 (DE) .................. 10 2019 126 408.1

(51) Int. Cl.
*G06K 9/20* (2006.01)
*G06V 40/13* (2022.01)
(Continued)

(52) U.S. Cl.
CPC ......... *G06V 40/1318* (2022.01); *G02B 6/002* (2013.01); *G06V 10/143* (2022.01)

(58) Field of Classification Search
CPC .................. G06V 40/1324; G06V 40/1318
See application file for complete search history.

(56) References Cited

U.S. PATENT DOCUMENTS 10,177,194 B2   1/2019   Lin et al.
2017/0085813 A1   3/2017   Reinhold et al.
(Continued)

FOREIGN PATENT DOCUMENTS

CN   108983 521 A   12/2018
CN   109426812 A   3/2019
(Continued)

*Primary Examiner* — Brian Werner
(74) *Attorney, Agent, or Firm* — Christensen, Fonder, Dardi & Herbert PLLC

(57) ABSTRACT

A device for displaying information and for capture of prints of a plurality of skin areas of human autopodia by means of reflection, comprising: a placement surface for applying the autopodia, a touch-sensitive layer, an LC unit with pixels arranged which are individually controllable by a control unit, an illumination unit with a transparent light-guide-layer body, first and second illumination means, and an optical sensor layer with sensors below the light-guide-layer body. The first illumination means emits diffuse light in a first wavelength range, and the second emits directed light in a predefined angular range and in a second wavelength range. The sensor elements are sensitive to light of the second wavelength range. The pixels are switchable between a state which is transparent to the diffuse light and directed light and a state which is opaque to the diffuse light, and are illuminated by the diffuse light for displaying information.

18 Claims, 6 Drawing Sheets

(51) Int. Cl.
     *G06V 10/143*      (2022.01)
     *F21V 8/00*      (2006.01)

(56) References Cited

U.S. PATENT DOCUMENTS

| | | |
|---|---|---|
| 2018/0165497 A1 | 6/2018 | Lee et al. |
| 2018/0260602 A1 | 9/2018 | He et al. |
| 2018/0357460 A1 | 12/2018 | Smith et al. |
| 2019/0012512 A1 | 1/2019 | He et al. |
| 2019/0065816 A1 | 2/2019 | Reinhold et al. |
| 2019/0080139 A1 | 3/2019 | Reinhold et al. |
| 2019/0129530 A1 | 5/2019 | Shen |
| 2020/0057340 A1* | 2/2020 | Jiang .................. G02F 1/13338 |

FOREIGN PATENT DOCUMENTS

| | | |
|---|---|---|
| CN | 109657530 A | 4/2019 |
| DE | 10 2017 119 983 B3 | 9/2018 |
| WO | WO 2019/041214 A1 | 3/2019 |

* cited by examiner a)

b)

c)

DEVICE FOR DISPLAYING INFORMATION AND FOR CAPTURING AUTOPODIAL IMPRESSIONS

PRIORITY CLAIM

The present application is a National Phase entry of PCT Application No. PCT/EP2020/073384, filed Aug. 20, 2020, which claims priority to German Patent Application No. 10 2019 126 408.1, filed Sep. 30, 2019, the disclosures of which are hereby incorporated by reference herein in their entirety.

FIELD OF THE INVENTION

The invention is directed to a device and a method for displaying information and for the simultaneous contact-based capture of prints of a plurality of blood-perfused skin areas of human autopodia, generally those of the finger. The reflection at a placement surface for the autopodia is utilized to generate the recordings of the prints; for example, the principle of frustrated total internal reflection can be used.

DESCRIPTION OF THE PRIOR ART

The development of mobile phones over the course of recent years into devices on which sensitive data are increasingly managed also requires increasingly higher standards for a secure authentication by the user. The users themselves also place a high value on the security of authentication. In addition to entering passwords or identification numbers, biometric authentication by means of personal features of the user are becoming increasingly prevalent. Known methods are based, for example, on face recognition. However, biometric authentication by means of fingerprints offers appreciably more information and, therefore, greater security, since appreciably more information is encoded in the papillary structure of the human finger than can be checked, for example, with biometric authentication by face recognition.

Authentication by means of an individual fingerprint has long been known. Mobile phones suitable for this purpose generally have an individual location for placement of the finger which is set off from the rest of the screen. A plurality of prints of fingers can be stored in a database, but it is always the case that only one individual print can be recorded at a time. Greater security is afforded by multiple-finger authentication in which the prints of multiple fingers are recorded simultaneously. For reasons of space and ergonomics, recording of this kind is carried out via the screen of the mobile phone. Sensor-screen combinations in which an optical image sensor—CMOS sensor, TFT sensor, CCD sensor, etc.—is linked with a screen—OLED screen, QLED screen, LCD screen, etc.—already exist in mobile devices. In order to allow screen inputs via fingers, a touch-sensitive layer is integrated in the screen in most cases.

The optical image sensor captures skin prints which are compared with data stored in the system in order to determine and possibly verify the identity of the user or also in order to trigger particular functions of applications which can be associated with specific fingers.

In other devices known from the prior art, the touch-sensitive area of the screen simultaneously serves as a placement surface for the fingers whose prints are to be recorded. Accordingly, no special area apart from the screen surface is needed for the capture of biometric features. The effective area for displaying information can be increased in this way because a separate sensor area for placement of a finger is no longer needed.

In this regard, it is preferable to use optical image sensors which, in contrast to capacitive or ultrasound-based fingerprint sensors, have the advantage that high-resolution recordings can be realized with them even over large distances between the optical sensor and the biometric object to be captured. This is especially important, for example, when additional cover films or cover glasses are applied to the screen surface by the user of the mobile device, for example, to protect against scratches. Liquid crystal (LC) screens are most commonly used as screens—also referred to hereinafter as "display"—because they are easy to produce and are long-lasting.

Reference is made in this connection, for example, to WO 2019/041214 A1 and US 2018/0165497 A1. Aside from the usual screen illumination, additional illumination which is arranged laterally and irradiates a skin area placed on the screen with directed light is used in these cases. Subsequently, the light of the additional illumination which is reflected back from the skin area is detected by an optical image sensor which is located below the screen or integrated in the screen. LC units which are outfitted with two-dimensional back-light illumination are usually used for displaying information on the screen. The optical sensor must be located in front of the opaque back-light illumination as viewed by the user and must itself be transparent, although the brightness losses are on a scale of greater than 50%. The light emitted by this back-light illumination propagates diffusely. The structures of the skin prints can generally not be resolved with sufficient precision in this way because the resolution decreases with increasing distance between the sensor and the applied object. Therefore, for irradiation of the applied skin areas with directed light, the arrangements have the above-mentioned additional illumination arranged laterally adjacent the back-light illumination, the light of the additional illumination being coupled into an own light guide arranged over the LC unit. This reduces the brilliance of the screen, and the displayed images and information appear less clear because, due to the additional illumination light, the light guide, the distance between the LC unit and the upper side of the cover layer is increased on the one hand and additional light-scattering structures and layers or further interfaces are arranged in the light path on the other hand. Moreover, the additional illumination is disadvantageously designed such that the placement surface cannot be entirely irradiated by the directed light with the same light intensity so that only a portion of the screen surface is available for capturing high-resolution skin prints; therefore, a simultaneous capture of the prints of a plurality of fingers is scarcely possible.

US 2018/0357460 A1 describes various devices which use LC units (LCDs, LC displays) to display information. According to FIGS. 16c, 16d of US 2018/0357460 A1, point light sources which are arranged in grid shape, for example, micro-LEDs which emit directed scanning light, are used for the illumination for capturing fingerprints in case of an LC display. The point light sources are arranged in front of the back-light illumination which emits diffuse light. The optical sensors are arranged above the illumination arrangements because the usual back-light illumination of an LC display is opaque on the side thereof remote of the pixels of the LC unit. In this case, the detectors are integrated in the backplane of the LC unit. So as not to completely block the light of the back-light illumination, the point light sources for generating the directed light are arranged at greater distances from one another than would be adequate, for example, for the pixel width and pixel height of the LC unit. In order to achieve the most uniform possible illumination nevertheless, light-blocking elements which block light coming from the back-light illumination are arranged in the areas between the point light sources so that, although the uniformity of the illumination—when point light sources are turned off—is increased, the brightness is disadvantageously reduced. Beyond this, it may be necessary when using point light illumination to capture the skin print portion by portion for reasons of precision and to assemble it subsequently to form a total print. The light sources for the point light illumination can also be arranged above the optical sensor elements. However, the latter are arranged above the back-light illumination of the LC unit in every case.

U.S. Pat. No. 10,177,194 B2 describes a device for displaying information and for contact-based capture of individual fingerprints with an OLED. An additional illumination device for emitting directed light is arranged below the OLED pixels which are not transparent, and the light is emitted in the regions between the OLED pixels. Accordingly, the entire possible surface is basically not available for light emission, and the brightness is reduced. The sensor elements are also arranged below the OLED pixels but above the additional illumination. A back-light illumination is not necessary due to the fact that it is an OLED. In the arrangements described in U.S. Pat. No. 10,177,194 B2, only a maximum of approximately 10% of the directed light emitted by the additional illumination arrives at the sensor elements for reasons pertaining to design so that a loss of precision may come about in this case. A light guide structure is used to generate the directed illumination. In U.S. Pat. No. 10,177,194 B2, in order to couple the directed light out of the light guide, light of the additional illumination is coupled into a transparent substrate layer and then into a light guide structure which is arranged below the transparent substrate layer and connected to the latter. The light-guiding structure in turn has a plurality of optical microstructures, for example, microprisms, which serve as out-coupling elements and guide the light in direction of a placement surface for a finger.

To summarize, the prior art devices with additional illumination layer arranged over the display unit used to display information have the drawback that, as a result, the brilliance and brightness of the displayed information are reduced, although the additional illumination is not active. When the additional illumination is activated, insofar as it is in the visible range, it can also cause blooming of the displayed information. While arrangements are also described in the prior art in which the additional illumination is arranged below the LC unit or OLED unit for generating directed light for recording fingerprints, high transmission losses occur which can impair the quality of the fingerprint recording. This can be compensated by stronger light sources, but this would ultimately lead to a higher energy consumption and is therefore disadvantageous particularly for mobile battery-operated devices.

SUMMARY OF THE INVENTION

Therefore, it is the object of the invention to develop an arrangement by which prints of skin areas of a plurality of autopodia can be captured simultaneously with high quality on the entire surface of the screen of the mobile device without impairing the brilliance of the screen and, beyond this, the arrangement should operate in the most energy-efficient manner possible. A further object consists in realizing a method for capturing prints of skin areas of a plurality of autopodia on a device of this kind in the most energy-efficient manner possible.

The above-stated object is met for a device for displaying information and for the simultaneous contact-based capture of prints of a plurality of blood-perfused skin areas of human autopodia by means of reflection, having the following features: Viewed from the direction of a contacting skin area, the device first of all comprises a placement surface for placing the autopodia. The placement surface is generally made of glass but can also be the interface of a protective film, for example, of plastic, applied to the glass. A touch-sensitive layer which registers whether or not skin areas are placed on the placement surface is arranged below the placement surface, again viewed from the direction of the contacting skin area. Such touch-sensitive layers are already known in the art and are connected to the control of the device in mobile devices, for example. In addition, the touch-sensitive layer in the present invention is also used for activating and deactivating the sensors for capturing skin prints.

An LC unit (liquid crystal unit) is arranged below the touch-sensitive layer. This LC unit comprises pixels arranged in grid shape which are generally made up of red, green and blue subpixels, the color definition being carried out by means of corresponding color filters. The pixels and subpixels are individually controllable by means of a control unit. The term "LC unit" refers herein exclusively to the pixel structures which are switchable to transmissive or opaque, but not to the back-light illumination thereof. Generally, the polarization structures above and below the pixels needed for changing the transmission characteristics belong to the LC unit as does the color filter which is arranged between the polarization structure above the pixels and the pixels. It is important that beyond those layers mentioned above—placement surface, possibly protective layer, touch-sensitive layer—no additional layers are arranged above the LC unit such as structured light-guiding layers or semitransparent sensor layers which could reduce the brightness or brilliance of the screen. The partly transparent backplane via which the pixels are controlled is arranged between the polarization structure below the pixels and the pixels themselves. The backplane can be provided on its underside in the opaque region with an absorbent layer to prevent reflections of light which is emitted in direction of the placement surface by the illumination unit described in the following.

An illumination unit with a transparent light guide layer body, first illumination source or means and second illumination source or means are arranged below the LC unit. The first illumination means is formed for illuminating the LC unit with diffuse light in a first wavelength range, i.e., light of the first wavelength range which is emitted into the light guide layer body and exits the latter diffusely upwardly in direction of the placement surface. Accordingly, the back-light illumination for the LC unit is realized by the first illumination means.

The second illumination means is formed to emit directed light in a limited angular range of no more than 20° around a given central angle, i.e., ±10° around the central angle; it emits light in a second wavelength range. The two wavelength ranges may be congruent, partially overlap or be completely distinct from one another. In particular, each of the wavelength ranges can also comprise only one individual wavelength within tolerances given, for example, by filters. The central angle is predetermined such that light which is emitted in the limited angular range and guided through the LC unit and the touch-sensitive layer at an underside of the placement surface would be at least partially reflected at the placement surface, for example, would principally be totally internally reflected, in the event of a medium which adjoins the placement surface and has a refractive index that diverges from the refractive index of the material of the placement surface. The medium can be air, for example.

The central angle need not form 0° with a surface normal of the placement surface, but rather preferably forms an angle between 0° and 80°, particularly preferably between 0° and 70°, with the surface normal. In a particularly preferable manner, the limited angular range also includes only angles of no more than 10° around the central angle to allow the sharpest possible imaging of the papillary structures on an optical sensor which is to be described in the following and, in so doing, also to sharply image details.

In this connection, two variants are particularly preferred. In one case in which the principle of frustrated total internal reflection is utilized for the reflection, the central angle is preferably greater than the critical angle of total internal reflection, for example, 42° in the case of the usual glass-air interface. In this way, the reflections at the interface are particularly strong, the light is utilized efficiently, and the contrast is correspondingly high. In a particularly preferable manner, the angles of the limited angular range all lie around the central angle such that they are greater than the critical angle of total internal reflection. In the other case, when the usual reflection is used instead of total internal reflection, the central angle is preferably 0° in order to keep the light path between reflection at the placement surface or interface and the detection at a sensor layer as short as possible and, therefore, keep the resolution as high as possible. In this case, the amount of light is appreciably smaller because, as a rule, no more than 4% of the light is reflected at the placement surface as boundary with air.

The diffuse illumination is not suitable by itself to image skin prints, since the distance between a sensor layer, which is arranged below the light guide layer body and will be described more fully later, and the placement surface can amount to several hundreds of micrometers so that the papillary structures of the skin and details such as pores cannot be resolved by the sensor elements. This loss of detail which can be on the order of only 50 μm is caused by the wide angular spectrum of the diffuse illumination which leads to blurriness of the structures to be imaged with increasing distance insofar as no imaging or collimating optics are used. On the other hand, the diffuse illumination is necessary in order to illuminate the screen as uniformly as possible when it is used to display information.

The pixels of the LC unit are switchable between a state which is transparent to the diffuse light and the directed light and a state which is opaque to the diffuse light, which takes place as a result of the change in the polarization direction of the light which is already linearly polarized when entering the LC unit. As described, the pixels of the LC unit are illuminated by the diffuse light emitted by the first illumination means for displaying information which is processed with the help of the control unit for the display. Switching into a state which is also opaque to the directed light is not absolutely necessary but is a possible option.

Finally, an optical sensor layer is arranged below the light guide layer body, this optical sensor layer having sensor elements which are arranged in grid shape and which are sensitive at least to light of the second wavelength range.

Accordingly, in contrast to the prior art, the optical sensor layer is arranged below the illumination unit. Since the sensor elements are arranged below the light guide layer body, the latter must be transparent in contrast to the prior art where the back-light illumination for LC units is configured to be opaque because the back-light illumination has on its underside a highly reflective layer which maximizes the luminous efficacy. In order to increase the luminous efficacy for the diffuse illumination in the device according to the invention, the surface of the sensor layer, or at least of the sensor elements, which is generally metallic can be configured to be partially reflective except for the apertures of the elements detecting the light of the second wavelength range.

Due to the fact that the sensor layer forms the lowest layer of the device, this sensor layer or sensor elements need not be transparent or semitransparent so that less expensive components can be used for this purpose, for example, CMOS-based sensors. Since all of the components which are necessary for registration of skin prints are arranged below the LC unit, the screen is not visually disturbed. Since neither the diffuse light nor the directed light need traverse areas with semitransparent sensors which generally transmit only 1% to a maximum of 30% of the emitted light, the energy efficiency can be improved; less energy is required for the same brightness as in conventional devices.

In a further embodiment form, the directed light is not changed with respect to the polarization direction by the LC layer at certain central angles so that it can always pass the LC unit unimpeded regardless of whether the LC unit is switched into the opaque state or transparent state. The reason for this is that particular LC units may be highly dependent on angle and wavelength with respect to transmission characteristics, as a result of which the directed light can pass through the LC unit independent from the switching state. For this purpose, the central angle of the directed light should be between 30° and 80°, preferably between 40° and 70°, and particularly preferably between 50° and 70°. In this embodiment form, an LC unit with uncrossed linear polarizers, i.e., parallelly oriented polarization filters, must be used because otherwise the directed light would be extinguished.

However, losses of about 50% may nevertheless occur with the LC unit during illumination with directed light due to polarization at the lower polarization structure when the utilized light is not polarized. Such losses can be prevented in that, for example, a laser or other light source emitting polarized light is used as light source for the directed illumination.

Further, it is possible in some constructions to also utilize the second illumination means to display information when the central angle is in the range above the critical angle of the total internal refection at the placement surface. This can be achieved, for example, in that the angle of inclination of suitable, e.g., prism-shaped, out-coupling structures is selected to be correspondingly large in order to impress a large directional change on the light guided in the light guide when impinging on the inclined surface of the light out-coupling structure. Further, this depends on the difference in the refractive index between the light guide and adhesion layers which surround the latter and which have lower refractive indices than that of the light guide, since this defines which light angles are guided at all.

In order to save energy, the first illumination means can be switched off during the capture of skin prints of autopodia. On the other hand, the second illumination means need only be activated when one or more skin areas are to be detected; this can be integrated in the control of a corresponding application, for example. The switching on of the second illumination means can be locally limited to areas in which the touch-sensitive layer has detected the placement of one or more skin areas during an illumination from the side, for example, on a stripe-shaped region.

In a particularly preferred configuration, the first wavelength range for the diffuse illumination and the second wavelength range for the directed illumination have no intersection, that is, the areas do not overlap. The superposition of the signals of the two illumination means can be minimized in this way. The first wavelength range then preferably comprises visible light, and the second wavelength range preferably contains nonvisible light, preferably in the NIR range between 780 nm and 3000 nm, and illumination in the UV-A range between 315 nm and 380 nm is also possible.

Alternatively, the second illumination means can be formed to also emit monochromatic light, that is, the second illumination means emits light only in a very narrow band. In this case, in order to separate the light of the second illumination means from the light of the first illumination means, a transmission filter is arranged between the optical sensor layer and the light guide body so that preferably only light of the second illumination means is allowed to pass.

The light guide layer body and the illumination means are essential component parts of the arrangement. The light guide layer body can be realized in various ways. In a first configuration, the light guide layer body comprises a lower transparent layer as part of the first illumination means and an upper transparent layer as part of the second illumination means. The two layers are preferably formed to be substantially plate-shaped, i.e., have two large surface areas—also referred to as main surfaces or large sides—which are arranged substantially parallel to one another and at a short distance from one another. The two large surface areas are connected at the edges by narrow sides which form the edges of the plate. The geometry of the plate is often rectangular, but this is not compulsory. The first illumination means comprises first light sources which emit light in the first wavelength range, and the second illumination means comprises second light sources which emit light in the second wavelength range. The light of the first light sources is coupled into the lower transparent layer, and the light of the second light sources is coupled into the upper transparent layer. The first light sources and second light sources are preferably arranged at a narrow side of the respective plate-shaped layer, and the light can then be coupled into the respective layer laterally via the narrow side or via a corner of the light guide layer which is preferably cut off or provided with a bevel for this purpose. When light is coupled in from the side particularly in the second light sources for generating the directed light, but also in the first light sources, it can be advantageous when the light source comprises a plurality of individual light sources, the emitting angle of each individual light source preferably being limited by collimating means, for example, absorbent cylindrical structures and/or optical lenses. The maximum available brightness is increased in this way. This spatial collimation is a great advantage particularly for the generation of directed light because the angle of incidence at which the light impinges on the light guide can already be limited from the outset to a small angular range which depends on the specific collimating structure. It is also possible to couple in light from below for the diffuse illumination when the first light sources are integrated, for example, in the optical sensor layer and are arranged, for example, between the sensor elements.

The light of the first light sources and the light of the second light sources is guided in the respective layer of the light guide layer body by means of total internal reflection (TAR); an incident angle range with angles under which light of the first light sources and light of the second light sources impinge from the side on an interface of the respective layer must accordingly be selected such that the light is also guided at the critical angles of the incident angle range through total internal reflection. Optical layers which have a lower refractive index than the respective layer of the light guide body are applied to the large surface areas. These optically low-refracting layers can comprise air or a transparent adhesive, for example. The transparent layers of the light guide body have interfaces at their main surfaces, and first out-coupling structures are formed at the interfaces of the lower transparent layer to couple out diffuse light and second out-coupling structures are formed at the interfaces of the upper transparent layer for coupling out directed light. In each of these two cases, the light is coupled out in direction of the placement surface.

It is also possible in principle to exchange the transparent layers with respect to their stacking sequence and, correspondingly, the illumination means and light sources and to form out-coupling structures at the interfaces of the lower transparent layer for coupling out directed light and out-coupling structures at the interfaces of the upper transparent layer for coupling out diffuse light even when this results in a further widening of the emitting angle of the directed light, i.e., the limited angular range should be correspondingly selected much narrower than in the first case where the widening of the returning light is not carried out until shortly before impinging on the sensor.

It is possible to form the first light sources and second light sources in such a way that the light is coupled into the lower transparent layer or upper transparent layer laterally, and the first light sources and second light sources are combined to form a common edge illumination. In the extreme case, the first light source and second light source are combined to form an individual light source, the light thereof being coupled into the light guide layer body via the edge. Since light of the same wavelengths is used both for the diffuse illumination and for the directed illumination, it is advisable to arrange an additional diaphragm layer between the optical sensor layer and the light guide layer body for solid angle selection so that the sensor elements of the optical sensor layer can receive substantially mainly, or only, light of the directed illumination.

The out-coupling structures for the directed light and for the diffuse light are formed such that the illumination per unit area is carried out predominantly homogeneously with respect to intensity and, for the directed light, also with respect to angular distribution regardless of whether skin parts of autopodia lie on the placement surface at one location or at a plurality of locations. This is realized by means of a correspondingly selected distribution of the out-coupling structures on the large surface areas. For example, the number of out-coupling structures can be increased with increasing distance from the side from which the light is coupled in.

In an alternative configuration of the device, instead of using a lower transparent layer and an upper transparent layer in the light guide layer body, the light guide layer body comprises an individual, transparent, substantially plate-shaped combination layer. The first illumination means comprises first light sources and the second illumination means comprises second light sources, and light of the first light sources is coupled into the combination layer preferably at a first narrow side, preferably laterally or laterally from a corner, and light of the second light sources is coupled into the combination layer preferably at a second narrow side opposite the first narrow side, preferably laterally or laterally from a corner, or from below by means of additional optical elements such as lenses or prisms which are arranged laterally of the sensor layer. In this case also, the light is guided by means of total internal reflection, and combination out-coupling structures are preferably formed at the interfaces of the transparent combination layer for coupling out diffuse light and directed light simultaneously in direction of the placement surface depending on an emitting direction, for example, proceeding from the first narrow side or second narrow side. Additionally or alternatively, first out-coupling structures and second out-coupling structures can also be arranged in this instance in order to increase or ensure homogeneity, for example, at an interface opposite that interface having the combination out-coupling structures. It is important in this respect in particular that the diffuse light be coupled out as homogeneously as possible. The means for homogenizing the directed light that is insignificant for the viewer of the screen because no information is to be displayed by it can also be integrated in the optical sensor layer in that, for example, the diaphragm size is adapted at that location or the sensitivity of the sensor elements is gradually increased with increasing distance from the side on which the light is coupled in, or a semi-transparent layer is applied with gradually decreasing absorption proceeding from this side.

The invention is further directed to a method for simultaneously capturing the skin prints of a plurality of autopodia placed on a placement surface, particularly with a device such as that described in the preceding. Viewed from the direction of the autopodia, the device comprises a placement surface, a touch-sensitive layer, an LC unit with individually controllable pixels arranged in grid shape, an illumination unit with a transparent light guide layer body and first illumination means for illuminating the LC unit with diffuse light in a first wavelength range and with second illumination means for emitting directed light in a second wavelength range, and an optical sensor layer with sensor elements which are arranged in grid shape and are sensitive to the light of the second wavelength range.

In the method, the LC unit of the device, for example, of a mobile phone or PC tablet, is initially illuminated with diffuse light in a first wavelength range by the first illumination means during operation, the pixels of the LC unit being switchable between a state which is transparent to the diffuse light and a state which is opaque to the diffuse light. Information can be displayed in this way. This is the usual operating mode of a screen or PC tablet of this kind when there is no finger placed on it. Information is displayed in color, since usually every pixel is composed of a plurality of subpixels emitting light of the basic colors red, green and blue.

The touch-sensitive layer detects whether or not skin areas are placed on the placement surface. When skin areas are placed on the latter, the sensor elements of the optical sensor layer are activated so that they can detect light. Further, the second illumination means which is switched off in normal operating mode in which only information is displayed are switched on. If a touch-sensitive layer is provided, the corresponding information about whether one or more fingers are applied, for example, is available automatically, and the touch-sensitive layer also registers the placement locations on the two-dimensional placement surface. User information can be displayed on the screen of the device simultaneously in conjunction with the capture of the prints.

After the second illumination means has been switched on, it emits directed light in a limited angular range of no more than 20° around a given central angle, where the central angle is predetermined such that light which is emitted in the limited angular range and which is directed through the LC unit and the touch-sensitive layer on an underside of the placement surface is mainly totally internally reflected at the placement surface in the event of an adjoining medium with a refractive index of air. However, the light passes through the placement surface particularly when skin ridges of a finger or of another autopodium are applied. Light reflected from the placement surface is then detected by means of the optical sensor layer. Since the sensor elements are arranged in grid shape, the detected light can be captured and registered as an impression of one autopodium or impressions of a plurality of autopodia, i.e., the intensity values detected by the optical sensor elements are processed to form a print or plurality of prints, and image processing methods known from the prior art are used. If the registration or capture of the skin areas of autopodia was successfully concluded or was aborted, for example, because a finger was removed from the placement surface before the recording could be finished, the optical sensor layer is deactivated and the second illumination means is switched off.

Since the second illumination means and the optical sensor elements only consume energy when fingers are applied, the method works in a very energy-efficient manner. Moreover, the switching on of the second illumination means and of the optical sensor elements can also be tied to further conditions, for example, the switching on can be limited to applications which explicitly require the checking of fingerprints such as applications for online banking, for example.

In a final step, the captured print or captured prints are compared with prints stored in a database and, depending on the results of the comparison, an action or several actions are possibly carried out. For example, a mobile device can be associated with a plurality of users in a company, and each of the users has his/her own user profile and own user surface. A profile specific to the respective user can then be loaded for a user surface based on the fingerprints.

In order to enhance security, an individual recording is preferably initiated for each autopodium applied. The recordings can also be repeated in case a change in position of one or more autopodia is detected or if additional autopodia are applied. In order to make the method even more energy-efficient, the detection of light of the second wavelength range can also be limited to regions in which the placement of an autopodium is detected by the touch-sensitive layer.

Possible applications of the invention reside mainly in the integration of multi-fingerprint sensors in LC screens. For example, they can be a component part of smartphones, tablets, television devices, laptops and other equipment with displays by which a user authentication is to be carried out. An example of an application is a touch-sensitive screen in a car having a virtual dashboard with a virtual start button which is enabled when the corresponding fingerprint of a registered user is detected and allows the car to start and/or a virtual switch by means of which a user-specific seating and mirror combination is adjusted.

It will be appreciated that the features mentioned above and those explained in greater detail below can be used not only in the indicated combination, but also in other combinations or by themselves without departing from the scope of the present invention.

BRIEF DESCRIPTION OF THE DRAWINGS

The invention will be described in the following referring to exemplary embodiments in the appended drawings which likewise disclose features essential to the invention. These exemplary embodiments are to be considered as merely illustrative and not restrictive. For example, it is not to be construed from a description of an embodiment example having a plurality of elements or components that all of these elements or components are necessary for its implementation. On the contrary, other embodiment examples may also contain alternative elements and components, fewer elements or components, or additional elements or components. Elements or components of various embodiment examples may be combined with one another unless otherwise indicated. Modifications and alterations which are described for one of the embodiment examples may also be applicable to other embodiment examples. To avoid repetition, like or similar elements are designated by like reference numerals in various figures and are not described multiple times. The drawings show.

DETAILED DESCRIPTION

Figure 1A:
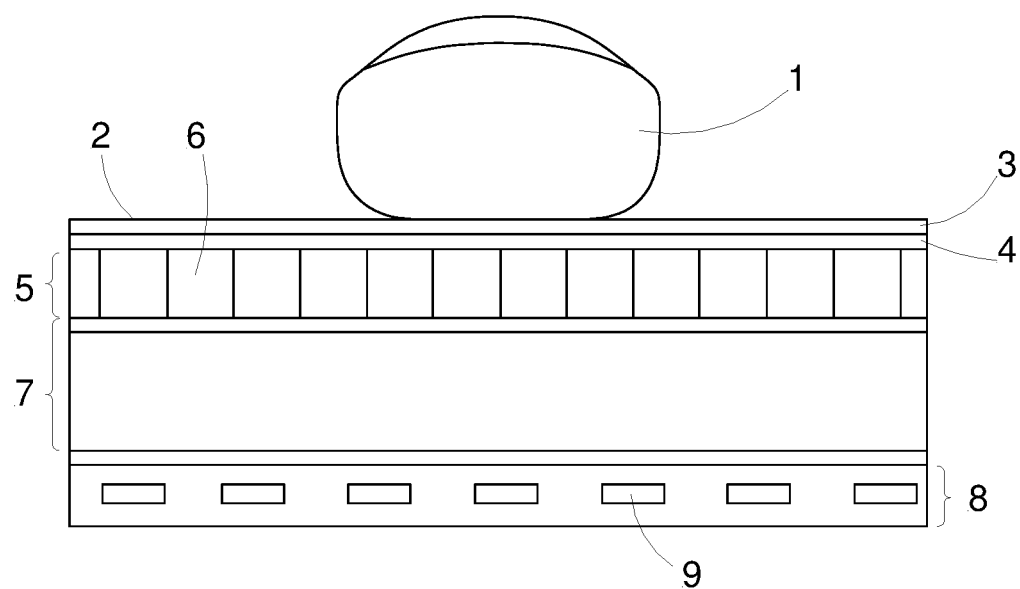
FIGS. 1a,b two cross-sectional views of devices for displaying information and for simultaneous contact-based capture of skin prints of autopodia with applied finger.

FIG. 1a shows a section through a device for displaying information and for the simultaneous contact-based capture of prints of a plurality of blood-perfused skin areas of human autopodia. In the present instance, a finger 1 serves as an example of an autopodium. Viewed from the direction of the contacting skin area, the device comprises first of all a placement surface 2 for placement of the autopodia. In the present case, this is part of an optional protective layer 3 which serves to protect elements located below it. For example, this can be a glass layer or plastic layer. A touch-sensitive layer 4 is arranged below the optional protective layer 3 and registers whether or not skin areas are placed on the placement surface 2. Below this touch-sensitive layer 4 is an LC unit 5 with pixels 6 which are arranged in grid shape and are individually controllable by means of a control unit, not shown. Below the LC unit 5 is an illumination unit with a transparent light guide layer body 7 and first illumination source or means and second illumination source or means which will be described more fully below referring to FIG. 2 and FIG. 3. Finally, an optical sensor layer 8 with sensor elements 9 arranged in grid shape is arranged below the light guide layer body 7.

The construction of the illumination unit will be described in more detail in the following referring to the alternative configurations according to FIG. 2 and FIG. 3. The illumination unit comprises the transparent light guide layer body 7 and first illumination means and second illumination means. The first illumination means is formed to illuminate the LC unit with diffuse light in a first wavelength range. On the other hand, the second illumination means is formed to emit directed light in a limited angular range of no more than 20° around a given central angle and in a second wavelength range. The central angle is predetermined such that light which is emitted in the limited angular range and is directed through the LC unit 5 and the touch-sensitive layer 4 at an underside of the placement surface would be at least partially reflected at the placement surface in case of a medium adjoining the latter and having a refractive index diverging from the refractive index of a material of the placement surface 2.

The pixels 6 of the LC unit 5 can be switched between a state which is transparent to the diffuse light and the directed light and a state which is opaque at least to the diffuse light. To display the information, it is illuminated through the diffuse light. However, the sensor elements 9 of the optical sensor layer 8 are only sensitive to light of the second wavelength range of the directed light, although it is not ruled out that the first wavelength range and second wavelength range overlap or that the second wavelength range is contained within the first wavelength range. The surface of the sensor elements 9 which faces the light guide layer body 7 can be configured to be reflective for increasing the luminous efficacy for the diffuse light and with a diaphragm structure for improving the angular selectivity and/or the homogeneity of the directed illumination. The central angle forms an angle between 0° and 80°, preferably between 0° and 70°, with a surface normal of the placement surface 2. The limited angular range preferably comprises angles of no more than 10° around the central angle, i.e., of ±5° around the latter.

However, when the first wavelength range and the second wavelength range overlap, the second illumination means can be configured such that it emits preferably monochromatic light in a very narrow wavelength range of a few nanometers. A transmission filter is preferably arranged between the optical sensor layer 8 and the light guide body 7 to separate the light of the second illumination means from the light of the first illumination means.

Figure 2:
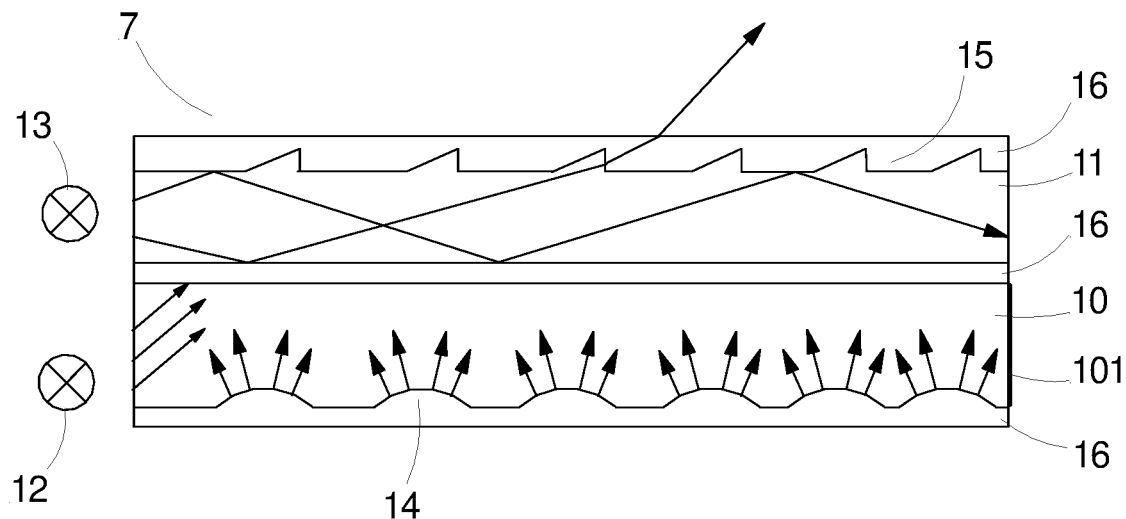
FIG. 2 a cross section through a light guide layer body with two transparent layers.
Figure 4:
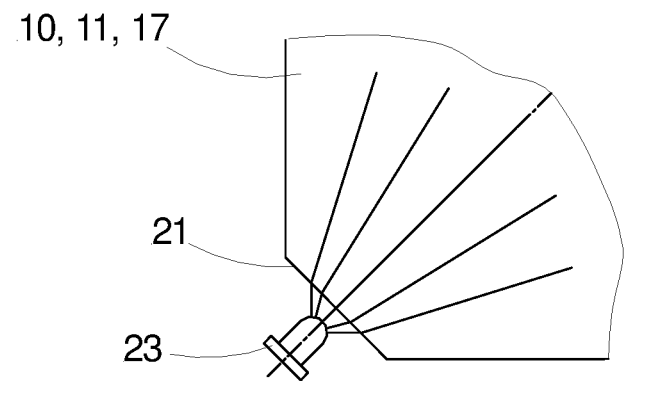
FIGS. 4a)-c) various possibilities for coupling light into a transparent layer of a light guide layer body.
Figure 4:
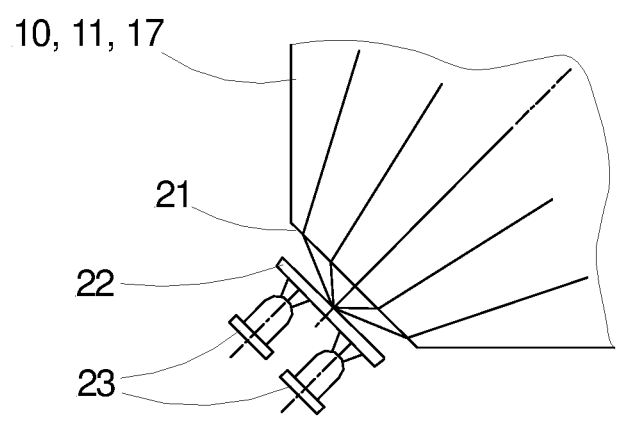
Figure 4:
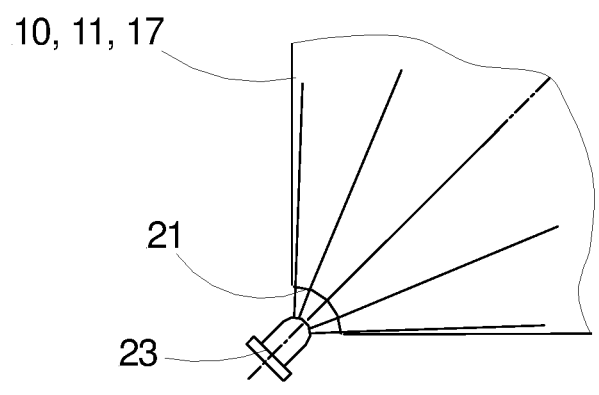
Figure 5:
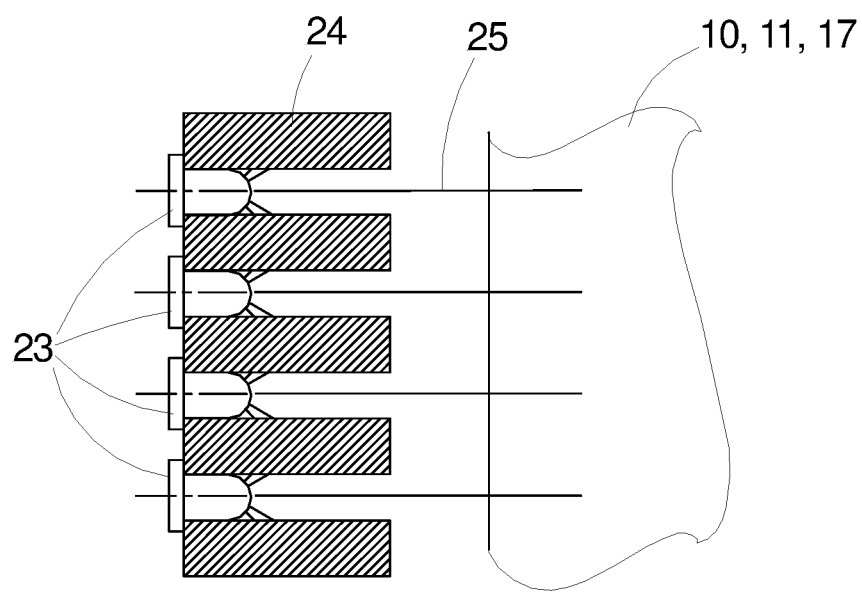
FIG. 5 a further possibility for illuminating a transparent layer of a light guide layer body.

FIG. 2 shows a first configuration of a light guide layer body 7 with first illumination means and second illumination means. In this instance, the light guide layer body 7 has a lower layer 10 and an upper layer 11. Both the lower layer 10 and upper layer 11 are formed from transparent materials such as, for example, glass, PMMA or polycarbonate and are substantially plate-shaped. The lower layer 10 is associated with the first illumination means, whereas the upper layer 11 is associated with the second illumination means. Accordingly, the lower layer 10 serves to illuminate the LC unit 5 with diffuse light in the first wavelength range, while the upper layer 11 serves to emit directed light as was described above. The first illumination means comprises first light sources 12, and the second illumination means comprises the second light sources 13. Both the first light sources 12 and the second light sources 13 are only shown symbolically in FIG. 2 and FIG. 3. Possible embodiments are shown in FIG. 4 and FIG. 5.

Light of the first light sources 12 is coupled into the lower transparent layer 10, for example, laterally, laterally from a corner, or from below. Light of the second light sources 13 is coupled into the upper transparent layer 11 laterally at a narrow side or laterally from a corner or from below. In the lower transparent layer 10 and in the upper transparent layer 11, the light is guided, respectively, through total internal reflection and, accordingly, cannot be coupled out of the light guides without auxiliary means. This auxiliary means is formed by first out-coupling structures 14 at interfaces of the lower transparent layer 10 and second out-coupling structures 15 at interfaces of the upper transparent layer 11. In this instance, "interfaces" means the large surface areas or main surfaces of the respective transparent layer 10, 11. The out-coupling structures 14, 15 can be arranged at one or both interfaces of the respective layer. In the present case, the first out-coupling structures 14 are formed as concave indentations in the lower transparent layer 10 at the lower interface. Alternatively or additionally, convex bulges can also be formed at the upper interface of the lower transparent layer 10. When light from the first light sources 12 which was irradiated into the lower transparent layer 10 impinges on the first out-coupling structures 14, it is deflected substantially diffusely and coupled out as is indicated by the small arrows.

Optionally, a reflective layer 101 can be applied to a narrow side of the lower transparent layer 10 opposite the narrow side serving to couple in light in order to improve the luminous efficacy of the diffuse illumination. On the other hand, the second out-coupling structures 15 are formed in this instance at the upper interface of the upper layer with an exemplary rectangular base area and prismatic longitudinal section. Alternatively or additionally, the out-coupling structures 15 could also be arranged at the lower interface of the upper layer 11 and can likewise be parallelepiped-shaped. Therefore, light is coupled out in this instance only within a narrow angular range which is predetermined by the geometry and, inter alia, by the angle of inclination of the prism surface or relief surface of the out-coupling structures, where the angle of inclination is preferably 5° to 25° relative to the large surface area of the transparent layer 11, particularly preferably 10° to 20°.

Both the directed light coupled out by the second out-coupling structures 15 and the diffuse light coupled out by the first out-coupling structures 14 are coupled out in direction of the placement surface 2. Separating layers 16 are arranged at the interfaces so that the light is conducted in the lower transparent layer 10 and in the upper transparent layer 11, respectively, by means of total internal reflection. These separating layers 16 can be air or an adhesive layer, for example. Other materials with a correspondingly lower refractive index than the transparent layers 10, 11 which allow the total internal reflection within the transparent layers 10, 11 can also be contemplated. For example, the refractive index of separating layer 16 is 1% to 30%, preferably 5% to 30%, particularly preferably 10% to 25% lower than the refractive index of the transparent layers 10, 11. In this instance, the separating layer 16 also fills up the concave indentations of the first out-coupling structures 14, for example. In particular, optically transparent double-sided adhesive strips (OCA) or liquid adhesives (LOCA) which harden under heat or UV radiation are also suitable as materials for the separating layer. For example, silicones, acrylate or epoxides having refractive indices of between 1.2 and 1.5, preferably between 1.3 and 1.47 and particularly preferably between 1.35 and 1.43 can be used for this purpose. The material for the transparent layers 10, 11, for example, glasses, PMMA or polycarbonate, etc., is selected with a refractive index between 1.4 and 1.8, preferably between 1.45 and 1.6 and particularly preferably between 1.47 and 1.55.

Figure 1B:
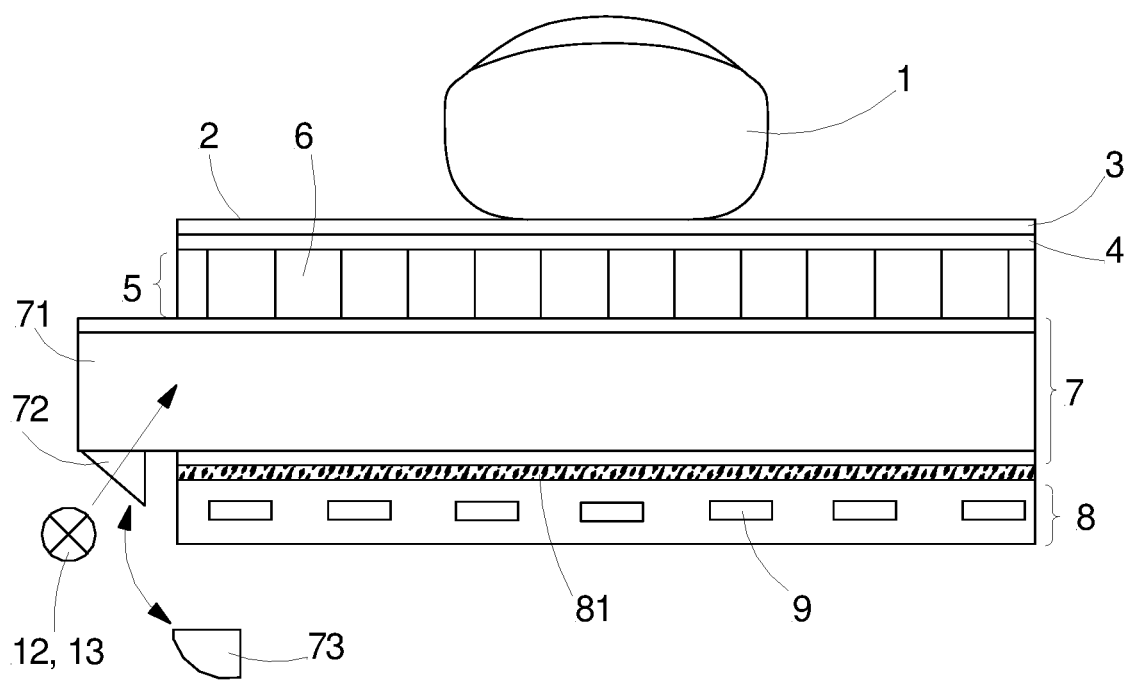

FIG. 1b shows a construction in which light is coupled into the light guide layer body 7 from below in at least one of the two transparent layers. In the example shown in FIG. 1b, light of the second light sources 13 is coupled into the upper transparent layer 11 and/or light of the first light sources 12 is coupled into the lower transparent layer 10. To this end, a projection 71 of the lower transparent layer 10—directed in this case toward the left-hand side—is formed at the light guide layer body 7. Similarly, a projection of the upper transparent layer 11, not shown, can also be formed on the right-hand side in order to couple light of the light sources 13 into the upper transparent layer 11 from below. Prism-shaped in-coupling elements 72 or lenticular in-coupling elements 73, for example, are then mounted on the underside of the projection 71 for coupling in light. An adhesive which is adapted with respect to refractive index and which accordingly has, as far as possible, the same refractive index as the transparent layers 11, 12 and the in-coupling elements 72, 73 is preferably used to connect these elements to the light guide layer body 7 or transparent layers 11, 12. In this way, the entire construction of the device can be designed more compactly, since light can also be coupled into very thin transparent layers 11, 12.

Further, in the configuration shown in FIG. 1b, a transmission filter layer 81 which can be configured, for example, as a bandpass filter and which is transparent substantially only to light of the second light source 13 is arranged between the sensor layer 8 and the light guide layer body 7. This is advantageous when the first wavelength range and second wavelength range overlap.

In FIG. 2, the first light sources 12 and the second light sources 13 are depicted separate. But, in case of lateral in-coupling, it is also possible to combine the first light sources 12 and the second light sources 13 to form a common edge illumination. Diaphragms for angle selection are then preferably integrated on the sensor elements 9 so that the sensor elements 9 preferably detect the directed light of the second light source after reflection at the placement surface. In this case, the first illumination means would always be switched on regardless of whether or not a fingerprint is registered.

Additionally, in case of two separate light sources 12, 13, it is advantageous to utilize an adapted transmission filter, for example, a bandpass filter, in the form of a transmission filter layer 81 between the optical sensor layer 8 and the lower transparent layer 10, this transmission filter preferably being transparent only to light of the second light source 13 in a narrow range of, e.g., 5 nm or 10 nm to 200 nm, preferably 10 nm to 100 nm, particularly preferably from 10 nm to 50 nm bandwidth. In this way, the light to be detected by the optical sensor elements 9 is spectrally limited to a narrow range of a few nanometers. The narrower the spectral range, the less interference light from the first light source 12 is detected by the optical sensor elements 9, but the amount of light that is detectable overall is also reduced so that the light efficiency decreases. In this case, an appropriate compromise must be found which is suited to the application, which is accomplished by means of the transmission filter layer 81 if the filter is not too narrow. The reduction in light efficiency can be countered with a monochromatic light source, and a transmission filter layer 81 with an even narrower bandwidth of less than 5 nm can correspondingly be utilized.

Figure 3:
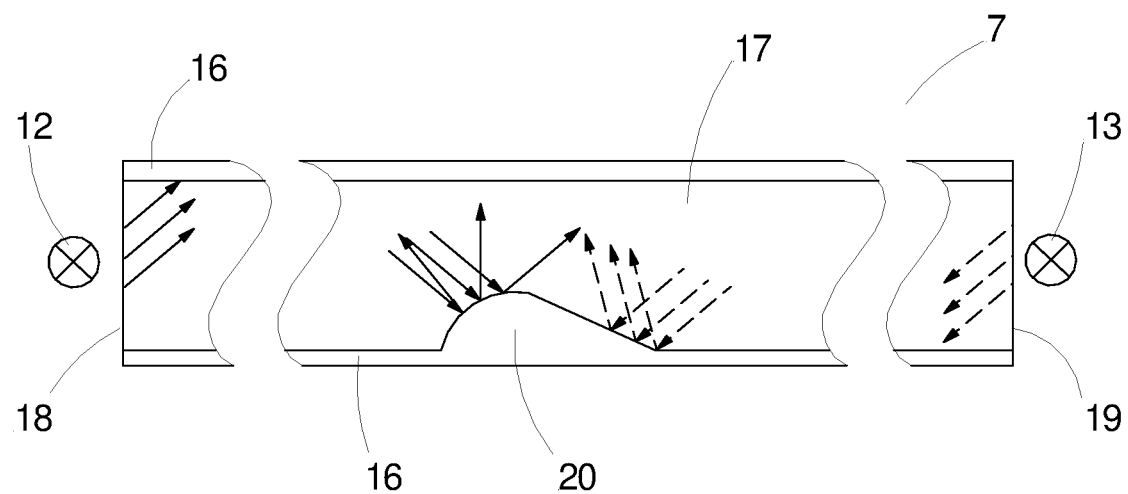
FIG. 3 a cross section through a light guide layer body in an alternative configuration.

A particularly preferred, alternative construction is shown in FIG. 3. In this instance, the light guide layer body 7 can be constructed thinner, which reduces the overall depth of the device. In this case, the light guide layer body 7 comprises a transparent, substantially plate-shaped combination layer 17, also referred to as individual layer. Except for the separating layers 16, the combination layer 17 is the only layer of the light guide layer body 7. In this case again, the first illumination means comprises first light sources 12 and the second illumination means comprises second light sources 13. Light of the first light sources 12 is preferably coupled into the combination layer 17 laterally or laterally from a corner at a first narrow side 18. Light of the second light sources 13 is preferably coupled into the combination layer 17 laterally or laterally from a corner at a second narrow side 19 opposite the first narrow side 18. In a plate-shaped light guide, those sides or edges which connect the large surface areas or main surfaces to one another are referred to as narrow sides. In this case also, the light is guided in the interior of the combination layer 17 by means of total internal reflection, and combination out-coupling structures 20 for coupling out diffuse light and directed light in direction of the placement surface 2 depending on an incident direction are formed at the interfaces of the transparent combination layer 17. Light can also be coupled into the combination layer 17 from the bottom when a projection is formed at both sides similar to the construction in FIG. 1a.

The combination out-coupling structures 20 are constructed in this instance such that when illuminated from the left-hand side referring to FIG. 3, i.e., proceeding from narrow side 18, with light of the first light source 12 indicated by the solid arrows, light is coupled out in direction of the placement surface 2 in an undirected, i.e., diffuse, manner. The corresponding part of the combination out-coupling structure 20 is formed in this instance by way of example with a—uniform or variable—curvature for coupling out diffuse, undirected illumination. Light originating from the second light sources 13 which enters from the opposite side and is represented in this instance by the dashed arrows is deflected in direction of the placement surface 2 when impinging on the combination out-coupling structure 20 proceeding from the right-hand side referring to FIG. 3. At this location, the combination out-coupling structure 20 has a plane surface which, however, has an inclination in the manner of a prism compared to the placement surface 2, that is, forms an angle other than zero with the placement surface 2. Depending on this inclination, directed light is coupled out at a defined central angle in direction of the placement surface.

Aside from the fact that the entire overall height of this construction appears smaller, fewer layers need also be connected to one another. The shorter distance from the placement surface also allows a higher image quality of the captured skin print. While a homogeneous intensity distribution can be achieved through the quantity and distribution of out-coupling structures 14, 15 at the interface when light sources enter only from one side—in the configuration shown in FIG. 2, the first light sources 12 and second light sources 13, respectively, can also be arranged on both sides in principle, unlike the configuration according to FIG. 3—this is true either only for the diffuse light or only for the directed light when using combination out-coupling structures 20, since the same spatial distribution of out-coupling structures is used for both diffuse light and directed light.

Generally, it is through the distribution of the combination out-coupling structures 20 that it is ensured that the intensity of the diffusely out-coupled light appears substantially homogeneous because this is the light that is predominantly perceived by the observer. In this case, light coupled in from the other side for the directed illumination is largely coupled out in the vicinity of the incident area, since many of the combination out-coupling structures 20 are located in that area. A homogenization can then advantageously be achieved at least for the detection of the directed light via additional apertures over the individual sensor elements 9 which have smaller apertures in the area where the light of the second light sources 13 is coupled in than on the opposite side where the light of the first light sources 12 is coupled in. The transmissivity can also be continuously varied with a transmission layer that becomes thicker or thinner as is described, for example, in DE 10 2017 119 983 B3, the disclosure of which is incorporated herein.

As is indicated by the arrows in FIG. 3, the light is preferably coupled into the light guide on both sides already under a determined angle which satisfies the precondition for total internal reflection so that better use is made of the light. This can be realized, for example, by an inclined arrangement of light sources at the light guide or in-coupling optics arranged upstream.

As regards the input of light, the simplest way is to couple the light in from the side as was shown by way of example in FIG. 3. However, in order to achieve the highest possible resolution of the biometric features of a finger placed on the placement surface, it is advantageous to couple the light into the corresponding layer via a corner. This is explained in more detail referring to FIG. 4. FIGS. 4a)-c) show three configurations of the illumination unit with a light guide layer body and illumination means for coupling light into corners. The diagram is a top view of a main surface of a transparent layer 10, 11 or 17 of the light guide body. FIG. 4a) shows an embodiment form for the in-coupling of light in which the first light source and second light source are formed as LEDs—the way in which the light is coupled in functions equally well for directed light and diffuse light—and in which the in-coupling of light is implemented on at least one surface formed by cutting off a corner of the corresponding transparent layer of the light guide layer body. A corner 21 which is cut off in this way produces an additional narrow side which forms an angle of 135°, for example, with the usual narrow sides of a rectangular plate-shaped layer. In this case, it is not necessary for the light emitted by the light sources 12, 13 to be pre-collimated in horizontal direction. In order to prevent reflections and the double images of fingerprints caused by them, it is advantageous to provide absorbent coatings at the other narrow sides of the light guide layer at which no light is coupled in. These absorbent coatings absorb light impinging at these other narrow sides or couple out the light laterally so that this light no longer reaches the placement surface.

FIGS. 4b) and c) show additional steps beyond FIG. 4a). In FIG. 4b), the light distribution or light homogenization is improved by means of a diffuser 22 so that light is emitted uniformly in all directions, whereas in FIG. 4c) the cut corner 21 is formed as a concave curve so that all of the rays exiting divergently from the first light source 12 or second light source 13 can enter the light guide layer continuously, and light exiting from only one individual LED can also propagate and be coupled out in the entire transparent layer 10, 11 or 17.

FIG. 5 shows a further configuration for coupling in light at a narrow side which is particularly suited for generating directed light. The first light source 12 and second light source 13 comprise many individual LEDs 23 which are arrayed along the narrow side used for in-coupling. The LEDs 23 are embedded in cylindrical or frustoconical absorption structures 24 which are shown in cross section. The absorption structures 24 provide for the spatial collimation of the light emitted by the LEDs to an angular range of, e.g., 10° around an axis 25. The available angular range depends particularly on the extent of the cylindrical or frustoconical absorption structure 24 in emitting direction.

Figure 6:
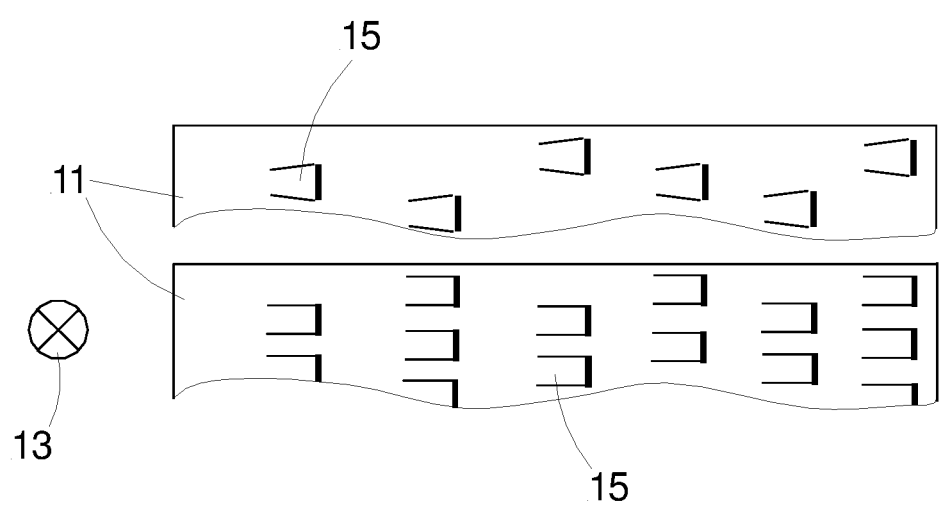
FIG. 6 possible arrangements of out-coupling elements in a top view.

FIG. 6 shows two sections of an upper transparent layer 11 with second out-coupling structures 15 in a top view. The second out-coupling structures 15 are wedge-shaped and present rectangles rising in a lectern-shaped manner from the direction of illumination or trapezoidal surfaces as is shown in section in FIG. 2. Shown here is the upper interface of the upper transparent layer 11 in which the second out-coupling structures 15 are formed. They are arranged in a plurality of rows, and the distance of the individual rows relative to one another decreases with increasing distance from the second light source 13 in order to improve the homogeneity of the intensity of the emitted light; this is also shown in FIG. 2.

Figure 7:
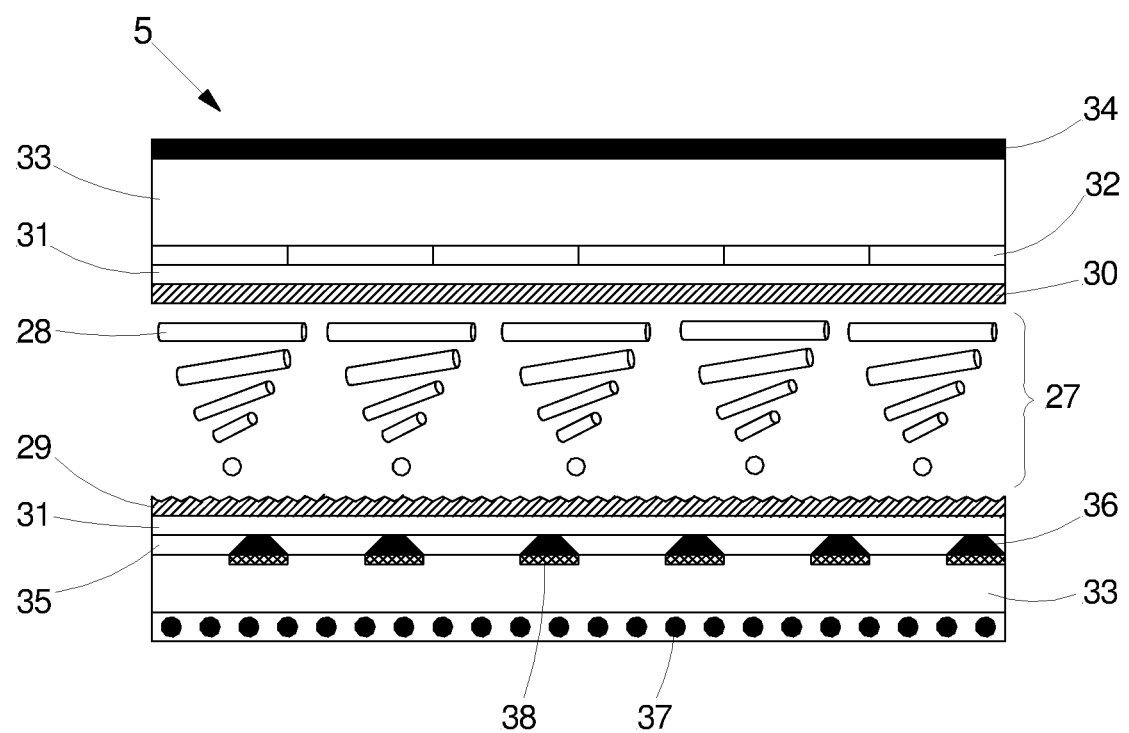
FIG. 7 a possible construction of an LC unit.

FIG. 7 shows a possible construction of an LC unit 5 in detail. The core of the LC unit 5 is formed by a liquid crystal layer 27 with liquid crystal molecules 28 contained in cells, not shown here. The liquid crystal molecules 28 are rod-shaped in this instance in order, for one, to graphically show the polarization direction and the rotation of the polarization of the light. The cells with the liquid crystal molecules 28 are bounded by a vertical orientation layer 29—in this instance below the liquid crystal layer 27—and a horizontal orientation layer 30, in this instance at the upper side of the liquid crystal layer 27. The orientation layers are, for example, glass plates with a plurality of parallel, either horizontally or vertically oriented microgrooves by means of which the liquid crystal molecules 28 are helically oriented mechanically along the length of the cell. Layer-shaped transparent electrodes 31 are arranged at the outer sides of the glass plates and, when voltage is applied, the orientation of the liquid crystal molecules 28 can be changed by these electrodes 31. Further, a color filter 32 and a glass substrate 33 are arranged on the upper side of the transparent electrodes 31 above the horizontal orientation layer 30, i.e., in emitting direction toward the placement surface 2, and a horizontal polarization filter 34 is arranged on the glass substrate 33. In this construction, an active semiconductor matrix or backplane 35, as it is called, is arranged on the underside of the electrodes 31 below the vertical orientation layer 29. This is a matrix of transistors 36, usually thin film transistors (TFTs), a transistor 36 being associated with each cell and controlling the electrode of this cell situated above it. The LC unit is terminated at the bottom by a glass substrate 33 and a vertical polarization filter 37.

In conventional screens, it is desirable to utilize as much light of the back-light illumination as possible to illuminate the screen. This is why reflections on metallic structures—for example, conductive traces—in the backplane 35 are not disruptive, since the reflected light can possibly be guided in direction of the LC unit again through further reflections. In the present case, however, reflections of diffuse or directed light which has been coupled out of the light guides situated underneath are not desirable because this light goes directly to the sensor layer 8 without impinging on the placement surface 2 beforehand. Accordingly, this reflected light negatively influences the detection of directed light with the sensor elements 9 because this light represents an offset without image information of prints. As a result of this offset, the light-sensitive elements of the sensor layer may already be saturated merely because of the back-reflection at the backplane structures, which makes it more difficult to detect finger lines. Therefore, in the construction described here, an absorbent layer 38 is arranged below the backplane 35, which absorbent layer 38 is likewise matrix-shaped with respect to structure and corresponds to the matrix structure of the backplane 35. This absorbent layer 38 reduces reflections at the backplane 35 and improves the quality of the recording. It will be appreciated that, alternatively or additionally, a transparent backplane comprising transparent conductive materials such as ITO, IZO or AZO and transparent semiconductors such as GaN or ZnO can also be used.

Figure 8:
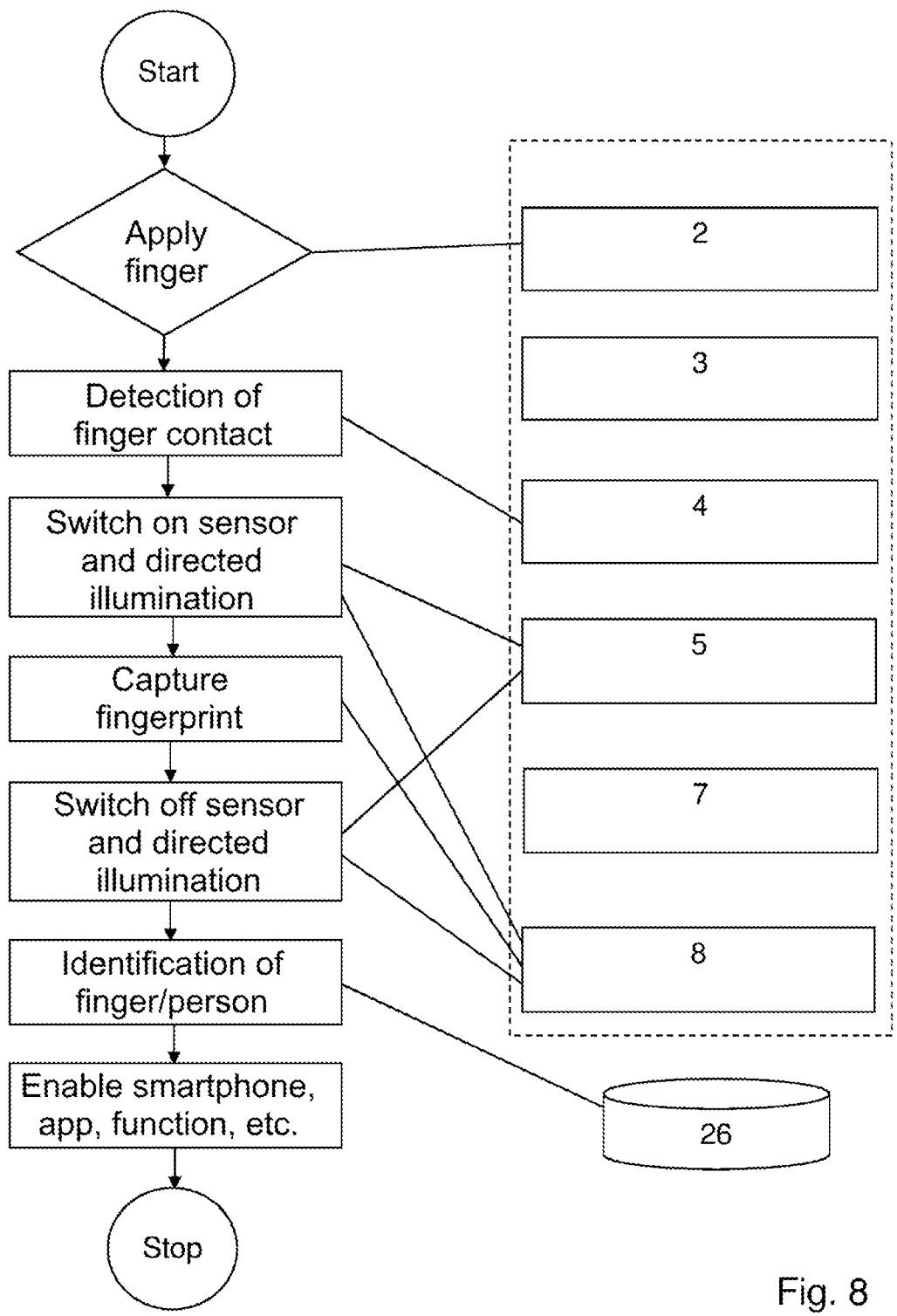
FIG. 8 the basic flow of a method for the simultaneous capture of the skin prints of a plurality of autopodia.

Lastly, FIG. 8 shows the basic flow of a method for the simultaneous capture of prints of a plurality of autopodia placed on a placement surface 2, which method can be carried out with a device particularly such as that described in the foregoing. The device comprises—viewed from the direction of the applied autopodia—the placement surface 2, a touch-sensitive layer 4, an LC unit 5 with individually controllable pixels 6 arranged in grid shape, an illumination unit with a transparent light guide layer body 7 and first illumination means for illuminating the LC unit 5 with diffuse light in a first wavelength range and second illumination means for emitting directed light in a second wavelength range. Adjoining the light guide layer body 7 is an optical sensor layer 8 with sensor elements 9 which are arranged in grid shape and are sensitive to light of the second wavelength range. The method can be implemented with a commercially available mobile phone with touch-sensitive screen, with touch-sensitive screens of PCs, etc. Accordingly, as a rule, information is already displayed on the screen. A user can now place the finger 1 on the placement surface 2 in a particular location on the screen in order to start an application, and the method steps to be described in the following are then carried out.

Another possibility for starting the method consists in that a security-relevant input is required in an already running application for which the user must identify himself/herself via fingerprints. Accordingly, in the normal state the LC unit 5 is illuminated with diffuse light in a first wavelength range by the first illumination means to display information, and the pixels 6 of the LC unit 5 are switchable between a state which is transparent to the diffuse light and a state which is opaque to the diffuse light. If the touch-sensitive layer 4 then detects whether or not fingers 1 are placed on the placement surface 2, the second illumination means is switched on or activated to emit directed light on the one hand and, on the other hand, the sensor elements 9 of the optical sensor layer 8 are activated, i.e., are enabled to detect incident light of the second wavelength range. In order to save energy, the detection of light of the second wavelength range can be restricted to areas in which the placement of an autopodium is detected by the touch-sensitive layer 4.

After the second illumination means is switched on, it emits directed light in a limited angular range of no more than 20°, preferably no more than 10°, around a predetermined central angle. The central angle is predetermined such that light which is emitted in the limited angular range and is guided through the LC unit 5 and the touch-sensitive layer 4 to an underside of the placement surface 2 is at least partially reflected at the placement surface 2 in case of an adjoining medium with a refractive index diverging from the refractive index of a material of the placement surface 2. If a finger 1 is making contact, the directed light is reflected at the locations of a skin valley because there is still a layer of air between the placement surface 2 and the finger 1 at the location of the skin valley. Conversely, at the locations where skin ridges are placed on the placement surface 2, the directed light passes through the placement surface 2 into the finger 1 and is scattered so that these areas appear darker in the image. Light reflected by the placement surface 2 is detected by means of the optical sensor layer 8 and, due to the differences in intensity, an image of the print of an autopodium or of the skin prints of a plurality of autopodia are recorded. When the recording of the skin prints of the autopodia is concluded or interrupted, the optical sensor layer 8 is deactivated and the second illumination means is switched off. The captured print or the captured prints are subsequently compared with prints stored in a database 26. Depending on the results of the comparison, various actions may be carried out when the finger 1 is detected, for example, the approval of a transaction, etc.

Due to the fact that the second illumination means and the optical sensor layer 8 are activated only when a fingerprint must actually be registered, the method can be configured to be particularly energy-efficient such that the registration or capture of the fingerprint scarcely impacts the life of the battery. The method steps may be repeated when autopodia are lifted off and placed again on another location or when further autopodia are applied. Preferably, an individual recording is carried out for each applied autopodium so that when four fingers are applied, for example, four images are ideally generated simultaneously.

With the device described above and the method described above, a multi-finger authentication can be integrated, for example, in mobile phones without impairing the quality of the display of information on the screen. Also, virtually the entire surface area of the device is available for displaying information, since the entire surface of the screen can be utilized for recognition of the fingerprint, and area need be provided exclusively for print detection. Moreover, the construction is very compact so that the overall depth of the corresponding device can be kept sufficiently flat.

REFERENCE NUMERALS 1 finger
2 placement surface
3 protective layer
4 touch-sensitive layer
5 LC unit
6 pixel
7 light guide layer body
8 sensor layer
9 sensor element
10 lower transparent layer
11 upper transparent layer
12 first light source
13 second light source
14 first out-coupling structure
15 second out-coupling structure
16 separating layer
17 combination layer
18 first narrow side
19 second narrow side
20 combination out-coupling structure
21 cut corner
22 diffuser
23 LED
24 absorption structure
25 axis
26 database
27 liquid crystal layer
28 liquid crystal molecule
29 vertical orientation layer
30 horizontal orientation layer
31 transparent electrode
32 color filter
33 glass substrate
34 horizontal polarization filter
35 backplane
36 transistor
37 vertical polarization filter
38 absorbent layer
71 projection
72 prism-shaped in-coupling element
73 lenticular in-coupling element
81 transmission filter layer
101 reflecting layer

The invention claimed is:

1. A device for displaying information and for simultaneous contact-based capture of skin prints of a plurality of blood-perfused skin areas of human autopodia via reflection, comprising, when viewed from the direction of a contacting skin area:
a placement surface for applying the autopodia,
a touch-sensitive layer which registers whether or not skin areas are placed on the placement surface,
an LC unit with pixels arranged in a grid shape which are individually controllable,
an illumination unit with a transparent light guide layer body, first illumination source and second illumination source, wherein:
the first illumination source is formed for illuminating the LC unit with diffuse light in a first wavelength range,
the second illumination source is formed to emit directed light in a limited angular range of no more than 20° around a given central angle and is formed in a second wavelength range,
wherein the pixels of the LC unit are switchable between a state which is transparent to the diffuse light and the directed light and a state which is opaque at least to the diffuse light, and are illuminated by the diffuse light emitted by the first illumination source for displaying information,
an optical sensor layer arranged below the light guide layer body, the optical sensor layer having sensor elements which are arranged in a grid shape and which are sensitive at least to light of the second wavelength range,
the first illumination source comprise first light sources and the second illumination source comprises second light sources, wherein:
the light guide layer body in a first variant comprises a lower transparent, substantially plate-shaped layer as part of the first illumination source and a substantially plate-shaped upper transparent layer as part of the second illumination source, wherein light of the first light sources is coupled into the lower transparent layer, and light of the second light sources is coupled into lower transparent layer, and light of the second light sources is coupled into the upper transparent layer, and the light in the lower transparent layer and in the upper transparent layer are guided, respectively, by total internal reflection, wherein first out-coupling structures are formed at interfaces of the lower transparent layer to couple out diffuse light in a direction of the placement surface, and second out-coupling structures are formed at interfaces of the upper transparent layer for coupling out directed light in a direction of the placement surface, or in that
the light guide layer body in a second variant comprises a transparent, substantially plate-shaped combination layer, wherein light of the first light sources is coupled into the combination layer at a first narrow side, and light of the second light sources is coupled into the combination layer at a second narrow side opposite the first narrow side, the light being guided therein by total internal reflection, wherein a combination of out-coupling structures are formed at interfaces of the transparent combination layer to couple out diffuse light and directed light in a direction of the placement surface depending on an emitting direction.

2. The device according to claim 1, wherein a surface of the sensor elements which faces the light guide layer body is formed to be reflective.

3. The device according to claim 1, wherein the central angle forms an angle between 0° and 80°, with a surface normal of the placement surface and/or the limited angular range includes angles of no more than 10° around the central angle.

4. The device according to claim 1, wherein the first illumination source can be switched off during the capture of skin prints of autopodia, and/or the second illumination source can be switched on for capturing the skin prints of autopodia.

5. The device according to claim 1, wherein the first wavelength range for the diffuse illumination and the second wavelength range for the directed illumination have no intersection, and the second wavelength range comprises nonvisible light.

6. The device according to claim 1, wherein the second illumination source is formed to emit monochromatic light and, in order to separate the light of the second illumination source from the light of the first illumination source, a transmission filter is arranged as a bandpass filter between the optical sensor layer and the light guide layer body which allows light of the second illumination source to pass.

7. The device according to claim 1, wherein referring to the first variant, the light of the first light sources and the light of the second light sources is coupled laterally into the lower transparent layer and upper transparent layer, respectively, and/or the first light sources and second light sources are combined to form a common edge illumination.

8. The device according to claim 1, in which the light is coupled into the light guide layer body laterally, wherein the first light sources and the second light sources each comprise a plurality of individual light sources, wherein the emitting angle of each individual light source is limited by collimation.

9. The device according to claim 1, wherein the illumination unit is formed to couple in the light of the first light sources and/or second light sources laterally via a corner.

10. The device according to claim 1, wherein, in case of a reflection based on frustrated total internal reflection, the central angle is greater than a critical angle of total internal reflection.

11. The device according to claim 1, wherein a backplane of the LC unit is provided with an absorbent layer on its side remote of the placement surface.

12. A method for simultaneously capturing skin prints of a plurality of blood-perfused skin areas of autopodia placed on a placement surface with a device which, viewed from the direction of the autopodia, comprises the placement surface, a touch-sensitive layer, an LC unit with individually controllable pixels arranged in a grid shape, an illumination unit with a transparent light guide layer body and a first illumination source for illuminating the LC unit with diffuse light in a first wavelength range and with a second illumination source for emitting directed light in a second wavelength range, and an optical sensor layer with sensor elements which are arranged in a grid shape and are sensitive to the light at least of the second wavelength range, wherein the method comprises the steps of:

the first illumination source couples the diffuse light into an upper transparent substantially plate-shaped layer of the light guide layer body such that the diffuse light is guided by way of total internal reflection, and first out-coupling structures couple out the diffuse light in a direction of the placement surface at interfaces of the lower transparent layer so that the LC unit is illuminated with diffuse light in a first wavelength range the first illumination source for displaying information, wherein the pixels of the LC unit are switchable between a state which is transparent to the diffuse light and a state which is opaque to the diffuse light, the touch-sensitive layer detects whether or not skin areas are placed on the placement surface and, when skin areas are placed on the latter, the sensor elements of the optical sensor layer are activated and the second illumination source is switched on, the second illumination source emits directed light in a limited angular range of no more than 20° around a given central angle, in that the second illumination source couples the directed light into a lower transparent substantially plate-shaped layer of the light guide layer body such that the directed light is guided by way of total internal reflection, and second out-coupling structures couple out the directed light in a direction of the placement surface at interfaces of the lower transparent layer, light reflected from the placement surface is detected by the optical sensor layer and prints of one or more skin areas are captured, after the capture of skin areas is concluded, deactivating the captured print or captured prints are compared with prints stored in a database.

13. The method according to claim 12, wherein a repetition of the capture is carried out when a change in position of one or more skin areas is detected or if additional skin areas are applied.

14. The method according to claim 12, wherein an individual capture is carried out for every applied skin area.

15. The method according to claim 12, wherein the directed illumination and/or the detection of light of the second wavelength range is limited to regions in which the placement of a skin area is detected by the touch-sensitive layer.

16. The device according to claim 5, wherein the first wavelength range comprises visible light.

17. The device according to claim 10, wherein the central angle is otherwise 0°.

18. The device according to claim 12, wherein depending on the results of the comparison, an action or several actions are carried out.

* * * * *